April 15, 1941.   R. B. WARMAN   2,238,786
MOTION CONTROL DEVICE
Filed Dec. 17, 1938

INVENTOR
Robert B. Warman
BY Popp and Popp
ATTORNEYS

Patented Apr. 15, 1941

2,238,786

UNITED STATES PATENT OFFICE 2,238,786

MOTION CONTROL DEVICE

Robert B. Warman, Kenmore, N. Y.

Application December 17, 1938, Serial No. 246,387

10 Claims. (Cl. 188—90)

This invention relates to a motion control device and is shown specifically as embodied in a hydraulic brake although the invention can also be applied to speed reducers, and other motion control devices, such as clutches.

One of the principal objects of this invention is to provide a motion control device, such as a brake, which operates hydraulically, the brake utilizing the principle of controllably resisting the flow of a fluid for its operation. In such a brake there is therefore no destruction or abnormal wear of parts in normal operation as compared with friction brakes.

Another object of the invention is to provide such a device in which the rotating parts rotate in a bath of lubricant completely sealed against outside dirt, abrasives and foreign matter thereby providing a hydraulic brake or the like having, normally, longer life than the mechanism to which it is affixed and requiring very little attention or replacement of parts.

Another object of the invention is to provide such a hydraulic brake which will not create a load upon the mechanism or vehicle to which it is affixed when the brake is in neutral position.

Another aim is to provide such a motion control device which operates positively and smoothly, without pulsation, chatter or grabbing.

Another object of the invention is to provide such a hydraulic brake which does not depend upon self-energization as employed in friction brakes for its braking power. Self-energizing friction brakes now in popular use can and do sometimes get beyond the operator's control when out of adjustment. In the present invention, the degree or intensity of braking effort in this brake is always in fixed relation to the operator's braking requirements as indicated by his intentional movement of the brake pedal or other actuating device.

Another object of the invention is to provide such a hydraulic brake which through balanced control of internal hydraulic pressures supplies its own operating power in exact amount needed regardless of braking load. In other words, the brake itself, not the operator's foot pressure on the pedal, performs the work. Boosters or other forms of outside supplementary pedal power are not required with invention no matter how severe the braking problem.

Another aim of the invention is to provide such a hydraulic brake which maintains its original adjustment throughout its entire life and permits, when used as a brake in an automobile, any desired braking balance between the front and rear wheels to be continuously maintained.

Another aim is to provide such a brake which never requires servicing beyond occasionally checking and replenishing the fluid.

Another purpose of the invention is to provide such a brake which can be so constructed as to make sudden and dangerous application of full braking pressure impossible. Over-sensitivity, particularly in automobile brakes, is apt to be dangerous and does not provide for most effective deceleration.

Another object of the invention is to provide a hydraulic brake which is not affected by weather and climatic conditions and in which its action is not subject to variations and fadeout under prolonged or continuous operation as is the case with friction brakes when, for example, used in descending a long, steep grade.

Another object is to provide such a braking device which can be conveniently used to control the coasting speed of a vehicle without constant foot pressure manually exerted on the brake pedal. Thus, the operator of a heavy truck could set a simple control device to maintain any desired speed in going down grade and would maintain this speed throughout the entire descent regardless of steepness or length.

Another aim of the invention is to provide such a device which can be manufactured at low cost and is readily adapted for installation wherever braking or motion control is desired.

Another aim is to provide such a motion control device which can be actuated mechanically, hydraulically, pneumatically, electrically, by vacuum or other means.

Another aim is to provide such a device which is entirely self-lubricating and which distributes internally generated heat over practically its entire outer surface, thereby permitting it to be effectively air-cooled or to be jacketed for the circulation of a cooling medium when used in installations presenting severe braking problems.

In the accompanying drawing:

Figs. 2, 3 and 4 are fragmentary cross sections taken on the correspondingly numbered lines on Fig. 1.

Figure 1:
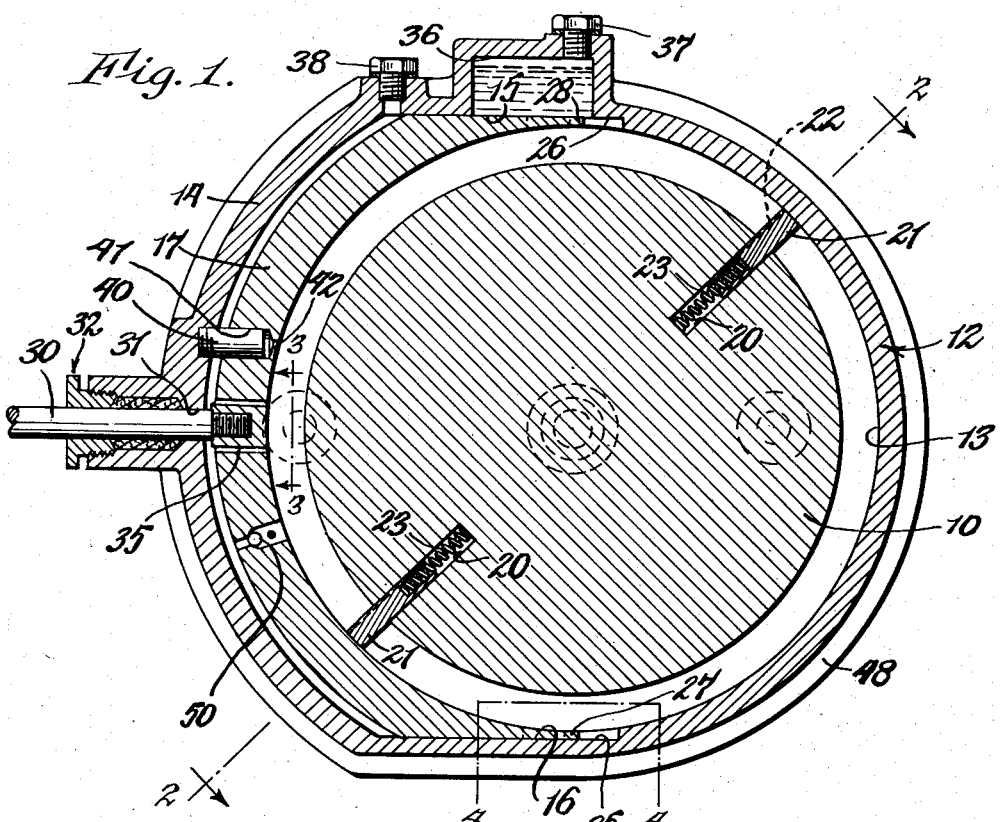
Fig. 1 is a vertical longitudinal section through a brake embodying my invention.
Figure 3:
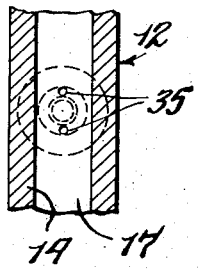

The invention is illustrated in the accompanying drawing as embodied in a brake which can be used, for example, in automobiles, although it will be understood from the following description that the principles embodied can be employed in other motion control devices, such as in speed reducers or clutches. The brake illustrated comprises a rotor 10 which is of cylindrical form and is shown as being comparatively thin. This rotor is fast to or integral with a shaft 11 which can be connected with the mechanism to be controlled, such as with the wheel of an automobile. This rotor is mounted in a casing 12 which can be made in any suitable manner and is shown as being half round at one end 13 and as being extended, as indicated at 14, at its opposite end. The opposite sides of the casing 12 are preferably flat and snugly fit the opposite flat faces of the rotor 10, and the rounding end wall 13 of the casing has its interior face disposed concentric to the axis of the shaft 11. The extended end 14 of the casing is formed in its upper and lower sides to provide a pair of horizontal guideways 15 and 16 in which the upper and lower parts of a movable or false wall 17 are slidably arranged. This movable or false wall 17 preferably closely fits the vertical side walls of the casing and is of semicircular form, its inner face being concentric with the axis of the shaft 11 in the neutral position of the device.

The rotor 10 is provided with two or more radial slots 20 which extend inwardly from its periphery and slidingly receive vanes 21. These vanes can be of any suitable form but are preferable slotted, as indicated at 22, so that the fluid used in the device can flow past the vanes to the bottom of the slots 20, the vanes 21 being thereby free to move into and out of the slots. Each vane 21 is yieldingly held in an outwardly projected position by a pair of small compression springs 23 interposed between the bottom of each slot 20 and the corresponding inner end of the vane.

The vanes 21 closely fit the opposite vertical faces of the casing and the compression springs 23 hold the ends of the vanes in engagement with the semi-circular face 13 of the casing and also the inner semi-circular face of the movable or false wall 17. In order to provide for a smooth transfer of the vanes from one of these faces to the other the slideway 16 in the casing is continued to provide a recess 25 extending halfway across the semi-circular wall 13 and similarly the slideway 15 is continued to provide a similar recess 26. The lower end of the movable or false wall 17 is extended on one side, as indicated at 27, to fit into the recess 25 and similarly the upper end of this movable or false wall is extended, as indicated at 28, to fit into the recess 26. It will therefore be seen that by so step cutting the casing and the ends of the movable or false wall 17 the movable wall can be slid back and forth along the slideways 15 and 16 and at the same time the vanes will pass smoothly over the stepped interfitted ends of the movable or false wall 17, thereby avoiding any irregularity in the rotating action of the rotor. The movable or false wall 17 can be moved along the slideways 15 and 16 in any suitable manner, as by the mechanical means shown or by hydraulic, air, vacuum pressure, etc. The means shown in the drawing comprises a rod 30 which is screwed into the movable or false wall 17 at its center and slides in a slideway 31 provided in the casing. In order to prevent the leakage of oil around the rod 30, the rod is preferably sealed by means of a stuffing box indicated generally at 32. To provide for free movement of the movable or false wall 17 in its slideways 15 and 16 means are provided for permitting a restricted amount of oil to flow past this wall.

As shown in the drawing these means comprise a pair of small holes 35 which are shown as arranged on opposite sides of the actuating rod 30 but are preferably arranged in different horizontal planes so that at no times can either of the vanes 21 completely seal these holes. These holes can extend through any part of the movable wall 17 and it will be observed that by properly proportioning the size of these holes the speed of brake application can be fixed. Thus, by making the holes small enough their resistance can be increased to a point where the movable or false wall 17 can be advanced at a predetermined maximum speed consistent with the maximum effective deceleration rate of the device or vehicle to be controlled.

While it may be desirable to limit the speed at which the wall 17 can be advanced in applying the brake, by proper proportioning of the size of the holes 35, it is desirable to have a quick recovery to neutral position when the need for braking has ceased. This would not be achieved if the oil were required to return through the restricted holes 35 upon release of the brake rod 30. In order to permit of a quick recovery of the wall 17 to its neutral position on release of the brake rod 30, a check valve 50 is shown as arranged in the movable or false wall 17, this check valve permitting of free flow of fluid from the chamber behind the movable or false wall 17 to the space between this movable wall and the rotor 10 but closing on a reverse movement of the movable wall so as to compel the fluid to pass through the restricted ports 35 which, as previously described, limit the maximum speed at which the brake can be applied thereby to avoid over-sensitiveness. It will be understood that suitable spring means (not shown) are provided which act in opposition to the brake pedal to normally return the movable or false wall 17 to the neutral position shown.

In order to provide for the oil displaced by the inward movement of the rod 30 either a mechanical compensator or an air chamber can be utilized, both being shown. The air chamber 36 is shown in Fig. 1 at the top of the casing. This chamber can be of an appropriate size to hold an excess of fluid when the brake is filled and for this purpose is shown as being provided with a plug 37 through which oil for replenishing the casing can be introduced. The casing is also provided with another plug 38 which leads to the space back of the movable or false wall 17 and provides an air escape when filling the casing with fluid thereby to prevent an air pocket from forming in rear of the movable or false wall 17. It will be understood that the air chamber 36 will receive the oil displaced by the inward movement of the rod 30, this being, of course, comparatively small.

I prefer, however, to provide a mechanical compensator. The compensator shown comprises a pin 40 which is of the same diameter or cross sectional size as the rod 30 and is screwed into or otherwise secured to the wall 14 of the casing 12. The pin 40 extends into the casing parallel with the rod 30 and slides into and out of a bore 41 provided in the movable or false wall 17, the inner end of this bore 41 being provided with a relief port 42. It will therefore be seen that the pin 40 acts in the manner of a piston, withdrawing from the bore 41 so as to draw oil into this bore as the operating rod 30 moves forwardly. It will therefore be seen that as the operating rod 30 is positively moved inwardly the oil displaced will pass through the relief port 42 into the bore 41, the pin 40 mechanically compensating for the oil displaced by the inward movement of the operating rod 30.

In the event that the casing is arranged in an air stream it can be provided with fins 48 for dissipating the heat generated by its braking operation.

Figure 4:
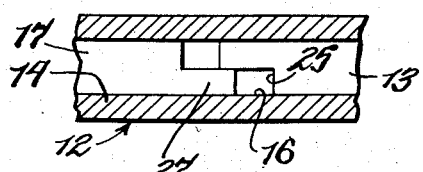

In operation it will be assumed that the casing is mounted on a stationary part of an automobile and hence is the stator and that the shaft 11 is connected with one of the wheels of the automobile. During the normal movement of the car the parts are in the position illustrated in Fig. 1 and the casing is filled with a suitable liquid to a point short of the top of the air chamber 36. In this condition of operation the inner face of the movable or false wall 17 is disposed concentric with the axis of the shaft 11 and hence the body of liquid contained between the rotor 10 and its surrounding concentric walls is swept around by the vanes 21, no work being done and no substantial amount of resistance being imposed upon the movement of the wheel since the cross-sectional area of the annular fluid chamber is uniform at any and all points. In this condition of operation each vane 21 alternately travels around and engages the inner face of the movable or false wall 17 and the inner face 13 of the casing and since both of these faces are concentric with and disposed at the same distance from the axis of the shaft 11 there is no inward or outward movement of the vanes 21. The vanes 21 pass smoothly from one of these walls to the other by reason of the stepped interfitting relation of these two walls, as best illustrated in Fig. 4.

When the operator desires to apply the brake he moves the rod 30 inwardly thereby moving the movable or false wall 17 toward the right, as illustrated in Fig. 1. During such movement a part of the oil arranged between the movable or false wall 17 and the rotor 10 passes through the restricted ports 35 to the space in back of the movable wall, thereby creating a counterpressure in back of the movable wall exactly equal to the pressure generated in the braking effort, and acting as an inbuilt booster which supplies precisely the needed amount of "pedal pressure." Power supplied by the operator manually need be only sufficient to overcome friction of moving parts and depression of the spring which returns the pedal to neutral position. By suitably restricting these ports 35 the speed of movement of the movable or false wall 17 in applying the brake can be regulated, thereby permitting of adjusting the apparatus so that the brake is not over-sensitive. The inward movement of the rod 30 in so displacing the movable or false wall 17 toward the rotor 10, of course, displaces a small amount of liquid within the casing. The liquid so displaced passes into the relief port 42 and bore 41, the pin 40 being moved out of this bore to the same degree that the rod 30 is moved inwardly. It will be understood that while such a mechanical compensator is desirable the air chamber 36 would also receive the oil displaced by the inward movement of the rod 30.

It will be seen that upon moving the movable or false wall toward the right, as viewed in Fig. 1, and out of concentric relation with the axis of the shaft 11, there will be provided a restricted passage between this movable or false wall and the rotor 10. This requires that the vane 21 on passing this area force the oil through the restricted space and as this requires the exertion of a substantial amount of force it will be seen that the movement of the rotor 10 will be retarded accordingly.

In releasing the brake, it will be assumed that a spring means connected with the brake pedal, both of which are not shown, serves to retract the rod 30 when the operator releases the brake pedal. The wall 17 is thereby automatically returned to the neutral position illustrated upon releasing the brake pedal. As it is desirable to have the brake returned to neutral instantly upon release of the brake pedal the check valve 50 is provided which permits the free flow of fluid from in rear of the movable or false wall 17 to the space between this movable wall and the rotor 10 otherwise, of course, the fluid would have to pass through the ports 35 which may be restricted so as to limit the speed of application of the brake as previously described.

In releasing the brake, of course, the compensating rod 40 moves inwardly to the same degree that the operating rod 30 moved outward and therefore the oil previously displaced by the inward movement of the operating rod 30 is returned to the space in rear of the movable or false wall 17.

It will be appreciated that while the invention has been illustrated as embodied in a hydraulic brake it can be readily adapted to use as a clutch or speed reducer or other motion control device in which case the casing instead of being fixed would be mounted for rotation so as to act as either the driving or the driven member.

From the foregoing it will be seen that the present invention provides a pure hydraulic brake or other motion control device which operates wholly through hydraulic action in forcing a fluid through a variably constricted space and thereby operates silently and positively and will outlast friction brakes since there is no substantial wear upon any of the parts. It will further be seen that the brake requires only negligible manual power to operate and at the same time does not have the disadvantages of self-energizing friction brakes and also can be so designed that it is not overly sensitive and cannot be too suddenly applied. It will also be seen that the brake shown will maintain its original adjustment and requires no servicing beyond occasionally checking the fluid level as in hydraulic shock absorbers and is completely sealed against the entry of dirt and other foreign matter and is not affected by climatic conditions. It will also be observed that the braking action does not vary during long periods of prolonged use and is readily applicable to use as a retarding device as in retarding heavy trucks on long downhill grades. It will also be seen that the brake can be manufactured inexpensively; is self-lubricating and that the internally generated heat can readily be dissipated through the exterior housing since such heat is distributed over substantially all of the casing surface.

I claim as my invention:

1. A motion control device interposed between two relatively rotatable parts, comprising a housing member secured to one of said parts and containing a fluid and having an inner circular face, a member secured to the other of said parts and having an external circular face normally concentric with the circular face of said housing member, movable vanes carried by one of said members and engaging the circular face of the other member, one of said members being made of two sections, means for moving one of said sections radially relatively to the other section and to the other member to vary the resistance to the flow of fluid induced by said vanes, said movable section being provided with an opening leading from its inner to its outer side thereby to balance the pressures on opposite sides thereof, said opening being of a predetermined maximum size to limit the speed of movement of said movable section toward the other member, and a check valve in another opening leading from the inner to the outer side of said movable section and permitting the unimpeded return of said movable section to its neutral position.

2. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, a C-shaped false wall carried by said housing member and having an internal semi-cylindrical face normally concentric with the semi-cylindrical face of said housing member and normally concentric with said circular member, movable vanes carried by one of said members and engaging the other member and means extending radially through said housing member for moving said false wall radially relative to the circular member to vary the resistance to the flow of fluid induced by said vanes, said false wall being provided with an opening leading from one side to the other and being of a predetermined restricted cross sectional size to control the speed of movement of said false wall toward said circular member.

3. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, a false wall carried by said housing member and having a semi-cylindrical face normally concentric with the semi-cylindrical face of said housing member and normally concentric with said circular member, movable vanes carried by one of said members and engaging the other member, means for moving said false wall relative to the circular member to vary the resistance to the flow of fluid induced by said vanes, said false wall being provided with an opening leading from one side to the other and being of a predetermined cross sectional size to limit the speed of movement of said false wall toward said circular member and a check valve in another similar opening and permitting unimpeded return of said false wall to its neutral position.

4. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, said housing member being provided with parallel slideways at the opposite ends of said semi-cylindrical face, a C-shaped false wall having parallel ends slidingly fitted in said slideways and having a semi-cylindrical face normally concentric with the semi-cylindrical face of said housing member and normally concentric with said circular member, movable vanes carried by said circular member and alternately engaging the semi-cylindrical faces of said housing and false wall, and means extending radially through said housing member for moving the false wall relative to the circular member to vary the resistance to the flow of fluid induced by said vanes.

5. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, said housing member being provided with parallel slideways at the opposite ends of said semi-cylindrical face, a false wall having its ends slidingly fitted in said slideways and having a semi-cylindrical face normally concentric with the semi-cylindrical face of said housing member and normally concentric with said circular member, movable vanes carried by said circular member and alternately engaging the semi-cylindrical faces of said housing and false wall, and means for moving the false wall relative to the circular member to vary the resistance to the flow of fluid induced by said vanes, the ends of said false wall being provided with tangentially extended portions to fit in correspondingly formed recesses provided at the ends of said semi-cylindrical face thereby to provide a ready transfer of said vanes from the semi-cylindrical faces of said false wall and housing member.

6. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, said housing member being provided with parallel slideways at the opposite ends of said semi-cylindrical face, a C-shaped false wall having its ends slidingly fitted in said slideways and having an inner true semi-cylindrical face normally concentric and continuous with the semi-cylindrical face of said housing member and normally concentric with said circular member and said false wall having an external rounding face generally concentric with its inner face, movable vanes carried by said circular member and alternately engaging the semi-cylindrical faces of said housing and false wall, and means for moving the false wall relative to the circular member to vary the resistance to the flow of fluid induced by said vanes, said means comprising a rod extending through said housing member and secured to said false wall and means for compensating for the liquid displaced by the movement of said rod.

7. A motion control device interposed between two relatively rotatable parts, comprising a housing member secured to one of said parts and containing a fluid and having an internal semi-cylindrical face on one side, a relatively thin circular disk-like member secured to the other part and arranged in said housing member concentric with its semi-cylindrical face, said housing member closely engaging the sides of said relatively thin circular disk-like member and said housing member also being provided with parallel slideways at the opposite ends of said semi-cylindrical face, the slideways being formed by recesses adjacent said ends and extending outward from said semi-cylindrical face, a false wall of the same thickness as the said relatively thin circular disk-like member having its ends slidingly fitted in said slideways and having a semi-cylindrical face normally concentric with the semi-cylindrical face of said housing member and normally concentric with said circular member, movable vanes of the same thickness as and carried by said relatively thin circular disk-like member and alternately engaging the semi-cylindrical faces of said housing and false wall, and means for moving the false wall relative to said circular member to vary the resistance to the flow of fluid induced by said vanes, said means comprising a rod extending through said housing member and secured to said false wall and means for compensating for the liquid displaced by the movement of said rod, comprising means providing an air chamber at the top of said housing member.

8. A motion control device interposed between two relatively rotatable parts, comprising a housing member secured to one of said parts and containing a fluid and having an internal semi-cylindrical face on one side, a circular member secured to the other part and arranged in said housing member concentric with its semi-cylindrical face, said housing member being provided with parallel slideways at the opposite ends of said semi-cylindrical face, a false wall having its ends slidingly fitted in said slideways and having a semi-cylindrical face normally concentric with the semi-cylindrical face of said housing member and normally concentric with said circular member, movable vanes carried by said circular member and alternately engaging the semi-cylindrical faces of said housing and false wall, and means for moving the false wall relative to the circular member to vary the resistance to the flow of fluid induced by said vanes, said means comprising a rod extending through said housing member and secured to said false wall and means for compensating for the liquid displaced by the movement of said rod, comprising a compensating piston interposed between said housing and false wall and secured to one and sliding in a bore provided in the other, said piston moving in said bore to withdraw fluid from said housing member as said rod is moved inwardly.

9. A motion control device interposed between two relatively rotatable parts, comprising a housing member secured to one of said parts and containing a fluid and having two internal semi-cylindrical faces on opposite sides, said faces being spaced from one another and in concentric relation but one of said faces being at a greater distance from the axis of said housing member than the other of said faces and said housing member being also formed to provide parallel slideways between said semi-cylindrical faces, said slideways being formed by recesses extending outward from one of said semi-cylindrical faces, a disk-like circular member secured to the other part and arranged in said housing member in concentric relation with one of said semi-cylindrical faces, a semi-cylindrical false wall having its ends slidingly fitted in said slideways and having its internal semi-cylindrical face normally concentric with said circular member, movable vanes extending radially outward from said circular member and alternately engaging one semi-cylindrical face of said housing member and the internal semi-cylindrical face of said false wall and means for moving said false wall along said slideways to vary the resistance to the flow of fluid induced by said vanes.

10. A motion control device interposed between two relatively rotatable parts, comprising a housing member secured to one of said parts and containing a fluid and having an internal semi-cylindrical face on one side, a relatively thin circular rotor member secured to the other of said parts and arranged in said housing member concentric with its semi-cylindrical face, said housing member closely engaging the sides of said rotor member, a C-shaped false wall carried by said housing member and having an inner true semi-cylindrical face normally concentric and continuous with the semi-cylindrical face of said housing member and normally concentric with said circular rotor member, said false wall being of the same thickness as the said rotor member, movable vanes of the same thickness as and carried by said rotor member and engaging the internal semi-cylindrical face of said housing member, and means extending radially through said housing member for moving said false wall radially relative to said housing member and to said rotor member to vary the resistance to the flow of fluid induced by said vanes, said false wall also being provided with an opening leading from its inner to its outer side thereby to balance the pressures on opposite sides thereof.

ROBERT B. WARMAN.